(12) United States Patent
Le

(10) Patent No.: US 8,162,016 B1
(45) Date of Patent: Apr. 24, 2012

(54) MODULAR TIRE CHAIN APPARATUS

(76) Inventor: Joe H. Le, Fairfield, CA (US)

( * ) Notice: Subject to any disclaimer, the term of this patent is extended or adjusted under 35 U.S.C. 154(b) by 311 days.

(21) Appl. No.: 12/614,506

(22) Filed: Nov. 9, 2009

(51) Int. Cl.
*B60C 27/10* (2006.01)

(52) U.S. Cl. ..... 152/217; 152/172; 152/175; 152/213 R; 152/213 A; 152/221

(58) Field of Classification Search ............. 152/167, 152/170, 171, 172, 173, 175, 177, 178, 179, 152/182, 184, 185, 185.1, 187, 189, 190, 152/191, 213 R, 213 A, 216, 217, 218, 219, 152/221, 231; D12/608
See application file for complete search history.

(56) References Cited

U.S. PATENT DOCUMENTS

| | | | | |
|---|---|---|---|---|
| 931,284 A * | 8/1909 | Duffy | ........................... | 152/221 |
| 2,275,994 A * | 3/1942 | Ruhkala | ........................ | 152/219 |
| 3,842,881 A * | 10/1974 | Muller et al. | ............. | 152/213 A |
| 3,893,501 A * | 7/1975 | Brummer et al. | ......... | 152/213 R |
| 4,185,674 A * | 1/1980 | Giannone | ..................... | 152/218 |
| D269,866 S | 7/1983 | Espedalen | | |
| 4,392,521 A * | 7/1983 | Giannone | ..................... | 152/218 |
| 5,804,001 A | 9/1998 | Christian | | |
| 6,026,876 A | 2/2000 | Snyder | | |
| 6,085,816 A | 7/2000 | Clark et al. | | |
| 6,915,825 B1 | 7/2005 | Stevenson, Jr. | | |
| 7,174,933 B1 * | 2/2007 | Miller | ........................... | 152/171 |
| 7,204,282 B2 | 4/2007 | Scott et al. | | |
| 2005/0115654 A1 * | 6/2005 | Badham | ........................ | 152/231 |

* cited by examiner

*Primary Examiner* — Kip T Kotter

(57) ABSTRACT

The modular tire chain apparatus provides for ease of installation due to connecting modules that allow a user to assemble the apparatus on a tire and wheel with greater ease than having to struggle with a continuous tire chain. A further advantage of the modules is that any number of modules needed to surround a tire and wheel are easily attached together, thereby providing a substantially universal fit to a plethora of tire sizes. And, the tie strap with spring with hook aids in securing the modules to a tire. Further the ties are secured, one to the other and to the outer members. The ratchet lock further ensures snug fit of the apparatus. The inner cable, outer cable, inner members, outer members, and cross members are available in rubber coated finish, thereby avoiding potential vehicle and wheel and tire damage.

2 Claims, 4 Drawing Sheets

MODULAR TIRE CHAIN APPARATUS

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Tire chains are widely used in snow and icy conditions in order to improve a vehicle's traction. One significant problem with tire chains, though, is that many are injurious to wheels and to tire sidewalls. An added problem is the installation and removal of tire chains, a task of sufficient difficulty that professional installation and removal is often required. While removal may be eased with a vehicle's arrival in improved road conditions, installation most often takes place in snow and ice, a factor that can greatly increase installation difficulty. Yet another problem with many tire chains is that the devices are sold in specific sizes in order to fit a given tire and wheel combination, thereby negating fit to anything other than a specific tire and wheel per chain set. The present modular apparatus solves these problems.

FIELD OF THE INVENTION

The modular tire chain apparatus relates to tire chains and other devices for improving tire traction in inclement weather.

SUMMARY OF THE INVENTION

The general purpose of the modular tire chain apparatus, described subsequently in greater detail, is to provide a modular tire chain apparatus which has many novel features that result in an improved modular tire chain apparatus which is not anticipated, rendered obvious, suggested, or even implied by prior art, either alone or in combination thereof.

To attain this, the modular tire chain apparatus provides for ease of installation due to connecting modules that allow a user to assemble the apparatus on a tire and wheel with greater ease than having to struggle with a continuous tire chain. A further advantage of the modules is that any number of modules needed to surround a tire and wheel are easily attached together, thereby providing a substantially universal fit to a plethora of tire sizes. And, the tie strap with spring with hook aids in securing the modules to a tire. Further the ties are secured, one to the other and to the outer members. The ratchet lock further ensures snug fit of the apparatus. The inner cable, outer cable, inner members, outer members, and cross members are available in rubber coated finish, thereby avoiding potential vehicle and wheel and tire damage.

Thus has been broadly outlined the more important features of the improved modular tire chain apparatus so that the detailed description thereof that follows may be better understood and in order that the present contribution to the art may be better appreciated.

An object of the modular tire chain apparatus is to be easily installed on a tire and wheel.

Another object of the modular tire chain apparatus is to negate tire and wheel damage.

A further object of the modular tire chain apparatus is to adjustably fit most tires and wheels with one apparatus.

An added object of the modular tire chain apparatus is to ensure adequate traction in inclement road conditions.

These together with additional objects, features and advantages of the improved modular tire chain apparatus will be readily apparent to those of ordinary skill in the art upon reading the following detailed description of presently preferred, but nonetheless illustrative, embodiments of the improved modular tire chain apparatus when taken in conjunction with the accompanying drawings.

In this respect, before explaining the current embodiments of the improved modular tire chain apparatus in detail, it is to be understood that the modular tire chain apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved modular tire chain apparatus. It is therefore important that the claims be regarded as including such equivalent constructions insofar as they do not depart from the spirit and scope of the modular tire chain apparatus. It is also to be understood that the phraseology and terminology employed herein are for purposes of description and should not be regarded as limiting.

DETAILED DESCRIPTION OF THE DRAWINGS

With reference now to the drawings, and in particular FIGS. 1 through 5 thereof, the principles and concepts of the modular tire chain apparatus generally designated by the reference number 10 will be described.

Figure 1:
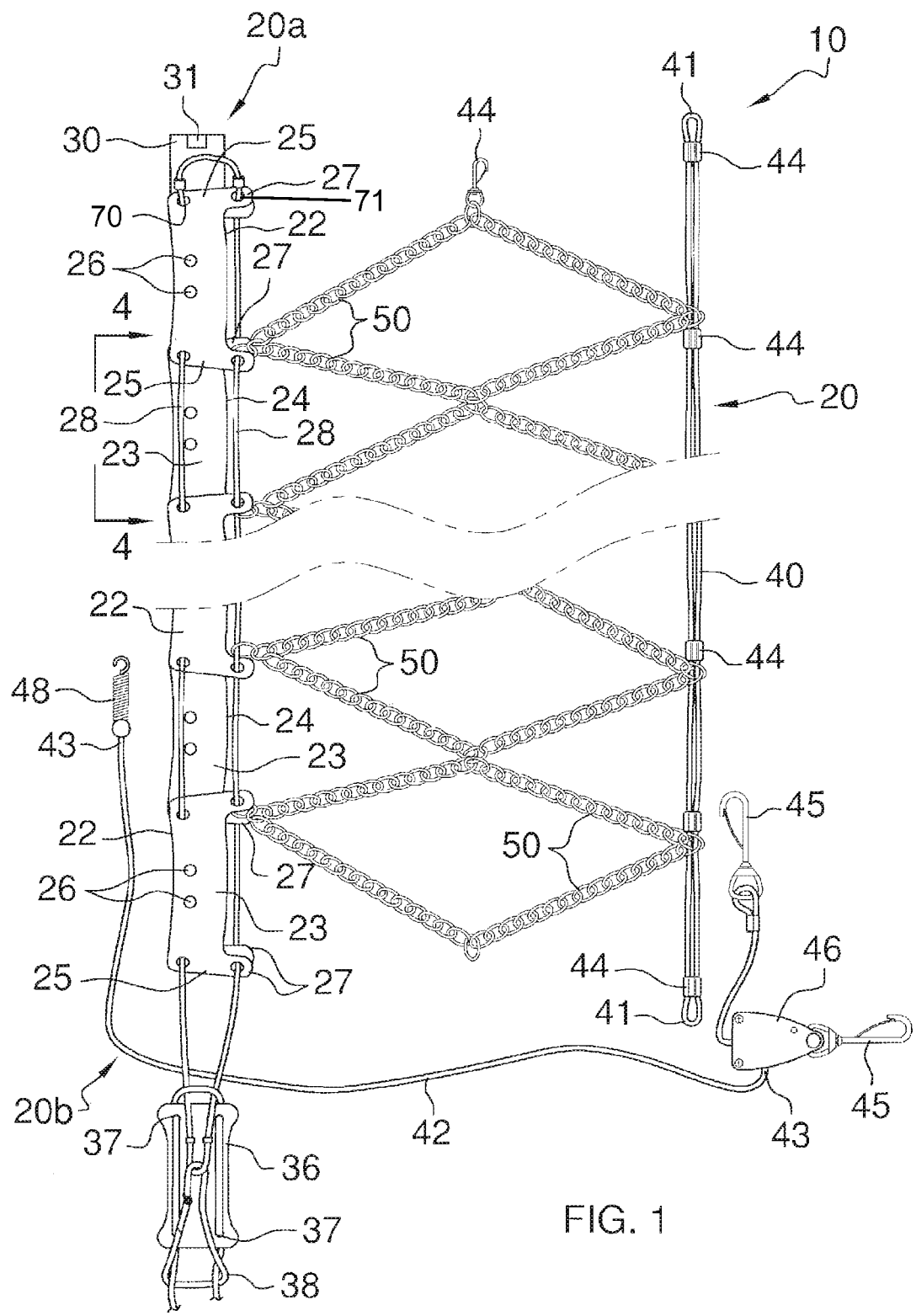
FIG. 1 is a top plan view of the embodiment with the first locking plate and plate with v-hook.
Figure 1A:
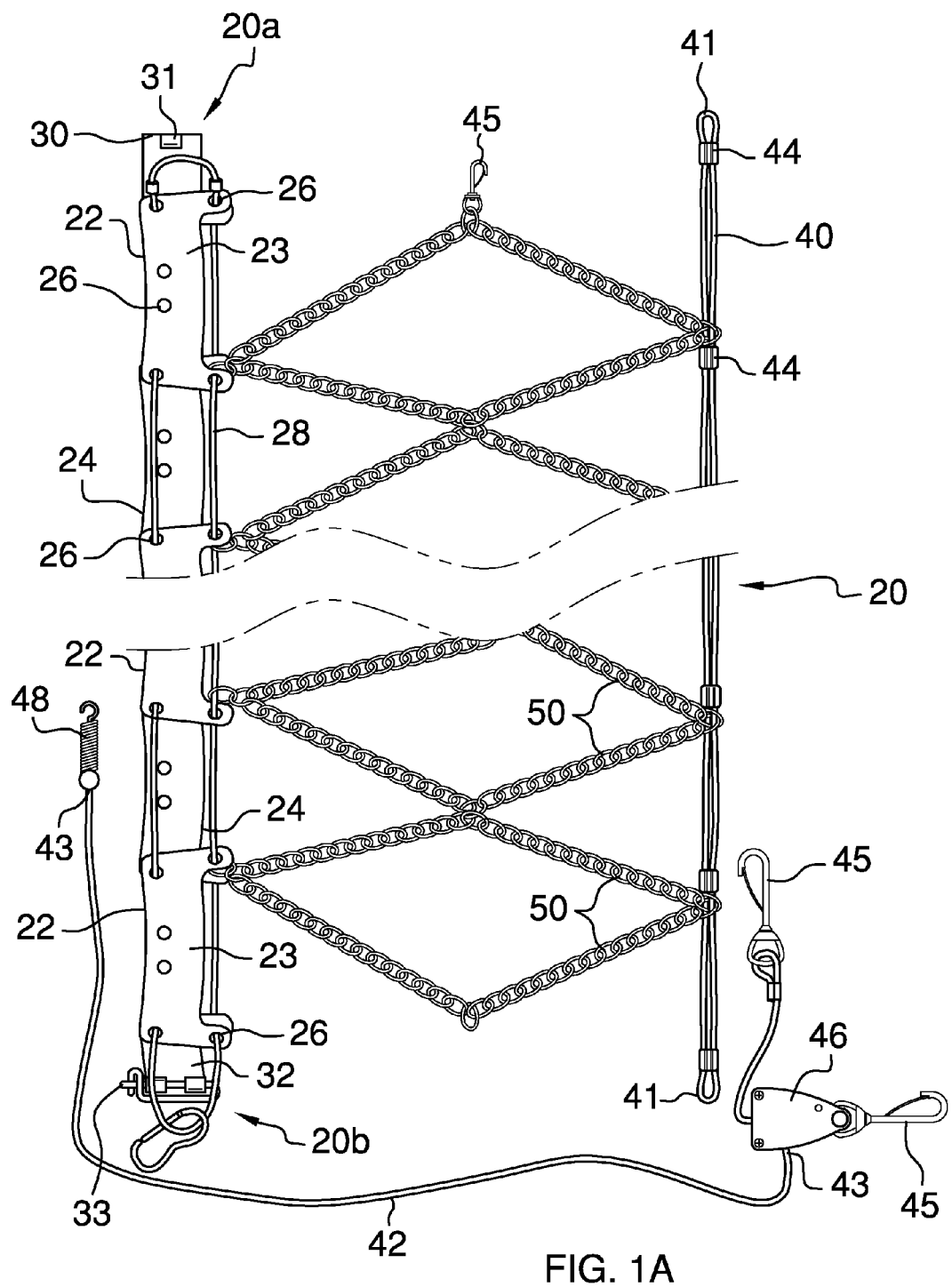
FIG. 1A is a top plan view of the embodiment having a first locking plate and a second locking plate.
Figure 4:
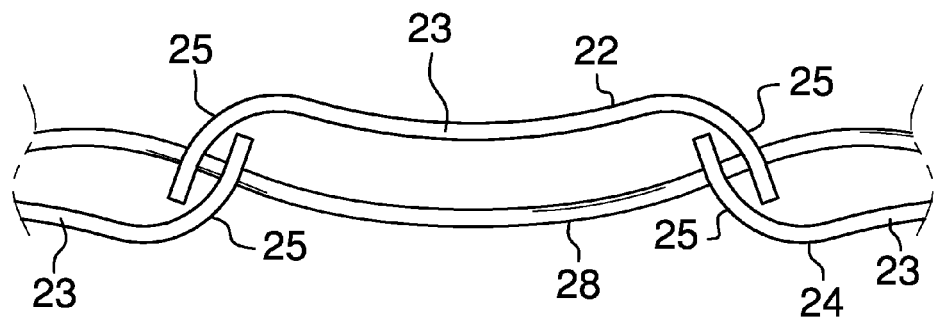
FIG. 4 is a partial lateral elevation view of FIG. 1, taken along the line 4-4.

Referring to FIGS. 1, 1A, and 4, the apparatus 10 partially comprises a plurality of modules 20. Each module 20 has a first end 20a spaced apart from a second end 20b. Each module 20 comprises a plurality of outer members 22. Each outer member 22 has a pair of spaced apart inwardly disposed bends 25 separated by a shank 23. A pair of spaced apart holes 26 is in the shank 23. One hole 70 is disposed in each bend 25. An ear 27 is extended from each bend 25. One hole 71 is disposed in each ear 27. A plurality of inner members 24 is provided. Each inner member 24 has a pair of spaced apart outwardly disposed bends 25 separated by a shank 23. A pair of spaced apart holes 26 is disposed in the shank 23. One hole 70 is disposed in each bend 25. An ear 27 is extended from each bend 25. A hole 71 is disposed in each ear 27.

Continuing to referring to FIGS. 1, 1A, and 4, a continuous outer cable 28 is passed through each outer member 22 bend 25 hole 26 and each inner member 24 bend 25 hole 26. The outer cable 28 is further passed through each outer member 22 ear 27 hole 26 and each inner member 24 ear 27 hole 26. The inner members 24 are disposed between the outer members 22 within each module 20.

Referring to FIGS. 2 and 3 and again to FIG. 1, the plate 36 has four spaced apart orifices 37. The outer cable 28 of one module 20 is passed through the orifices 37. The first locking plate 30 is attached to the outer cable 28 of each module 20 first end 20a. The latch 31 is removably hooked to one module 20 second end 20b outer cable 28. The latch 31 is disposed on the first locking plate 30. The v-hook 38 removably connects the outer cable 28 of one module 20 to the outer cable 28 of another module 20.

Figure 5:
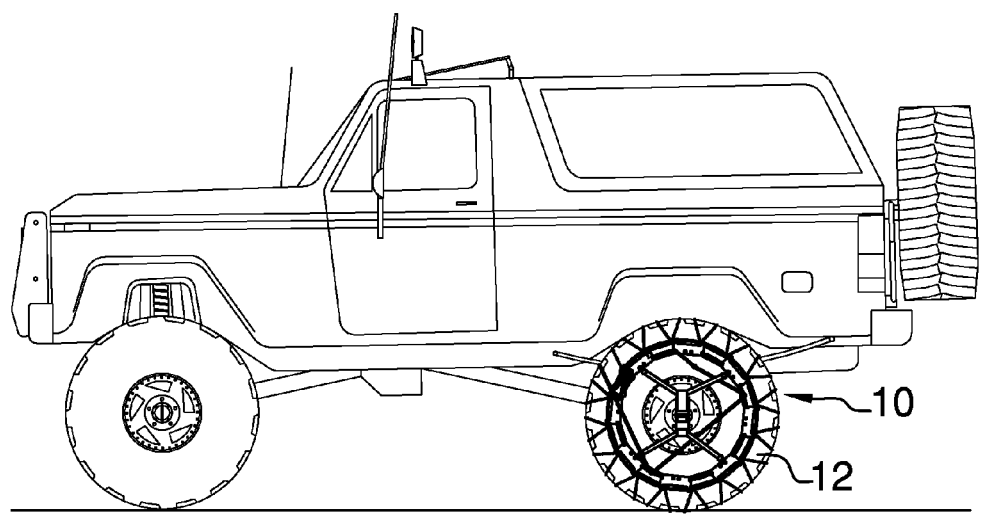
FIG. 5 is a lateral elevation view of the apparatus installed on an existing tire and wheel of a truck.

Referring to FIG. 5, as few as one module 20 may be used to encircle a tire 12, and any needed numbers of modules 20 are connected to encircle a larger tire 12, for example. The continuous inner cable 40 has spaced apart loops 41. A plurality of spaced apart cable ties 44 is disposed along the inner cable 40. The lock 46 has two opposite j-hooks 45. The j-hooks 45 connect the inner cable 40 loops 41. The tie strap 42 has two spaced apart opposite strap ends 43. The spring with hook 48 is disposed on one strap end 43. The opposite strap end 43 is attached to the lock 46. The spring with hook 48 is removably attached to an outer cable 28 of one module 20. The tie strap 42 is removably passed through the outer cables 28 of adjoining modules 20.

Figure 2:
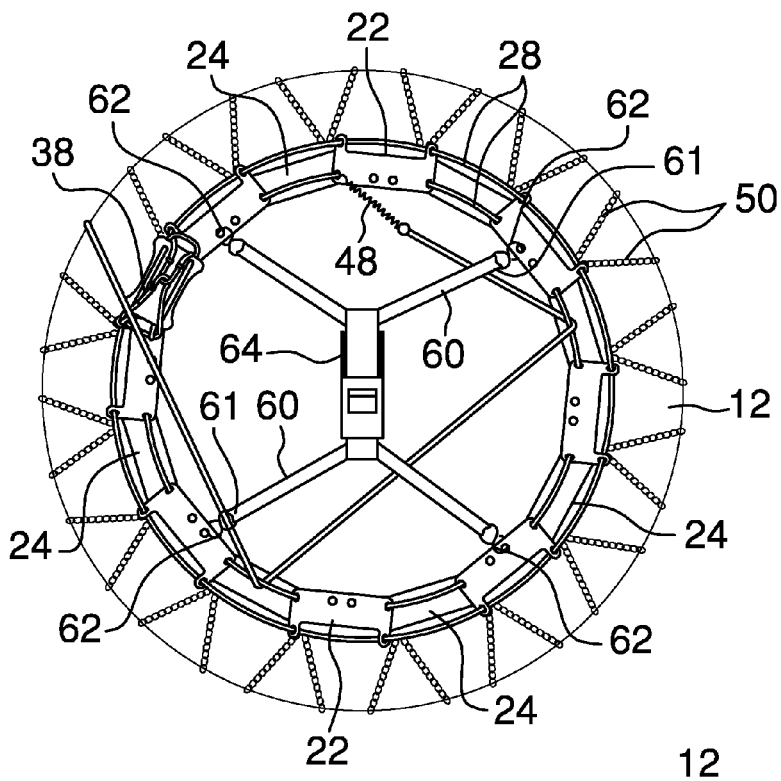
FIG. 2 is an outer lateral elevation view of the apparatus installed on a tire.
Figure 3:
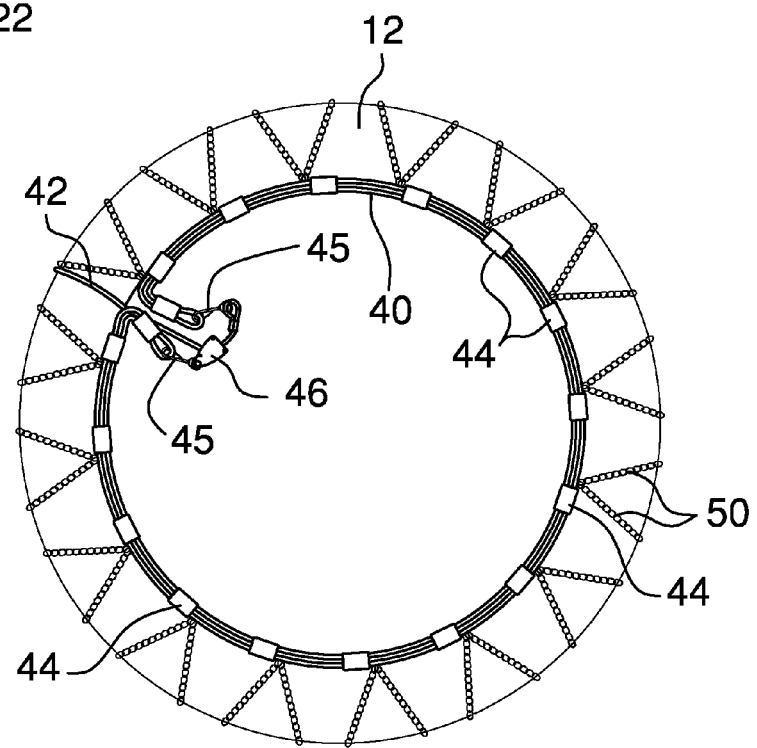
FIG. 3 is an inner lateral elevation view of the apparatus installed on a tire.

Referring to FIGS. 1, 1A and 2, the plurality of continuous flexible cross members 50 is provided. Each cross member 50 is attached to one module 20 outer cable 28 and one module 20 inner cable 40. Each cross member 50 of each module 20 is attached to an adjoining cross member 50. Each cross member 50 thereby forms a diamond shape. The pair of identical ties 60 is provided. Each tie 60 has a pair of spaced apart ends 61. A tie hook 62 is disposed on each end 61. One tie hook 62 is removably hooked through one module 20 outer member 22 hole 26. One tie hook 62 is removably hooked through an adjoining module 20 outer member 22 hole 26. The ratchet lock 64 removably connects the ties 60.

Referring to FIG. 1A, the embodiment slightly differs from FIG. 1 in that the module second end 20b is equipped with the second locking plate 32. The pin 33 of the second locking plate 32 is selectively hooked to the latch of a module 20 first locking plate 30.

With respect to the above description then, it is to be realized that the optimum dimensional relationships for the parts of the modular tire chain apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the modular tire chain apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the modular tire chain apparatus may be used.

Therefore, the foregoing is considered as illustrative only of the principles of the modular tire chain apparatus. Further, since numerous modifications and changes will readily occur to those skilled in the art, it is not desired to limit the modular tire chain apparatus to the exact construction and operation shown and described, and accordingly, all suitable modifications and equivalents may be resorted to, falling within the scope of the modular tire chain apparatus.

What is claimed is:

1. A modular tire chain apparatus comprising, in combination:
    a plurality of selectively attached modules, each module having a first end spaced apart from a second end, each module comprising:
    a plurality of outer members, each outer member having a pair of spaced apart inwardly disposed bends separated by a shank;
    a pair of spaced apart holes in the shank;
    a hole disposed in each bend;
    an ear extended from each bend;
    a hole disposed in each ear;
    a plurality of inner members, each inner member having a pair of spaced apart outwardly disposed bends separated by a shank;
    a pair of spaced apart holes in the shank;
    a hole disposed in each bend;
    an ear extended from each bend;
    a hole disposed in each ear;
    a continuous outer cable passed through each outer member bend hole and each inner member bend hole, the outer cable further passed through each outer member ear hole and each inner member ear hole, the inner members disposed between the outer members;
    a plate having four spaced apart orifices, the outer cable of each module passed through the orifices;
    a first locking plate attached to the outer cable of each module first end;
    a latch disposed on the first locking plate, the latch removably hooked to an outer cable of one module second end;
    a v-hook removably connecting the outer cable of one module to the outer cable of another module;
    a continuous inner cable having spaced apart loops;
    a plurality of spaced apart cable ties disposed on the inner cable;
    a plurality of continuous flexible cross members, each cross member attached to one module outer cable and one module inner cable, each cross member of each module attached to an adjoining cross member, each cross member forming a diamond shape;
    a lock having two opposite j-hooks, the j-hooks connecting the inner cable loops;
    a tie strap having two spaced apart opposite strap ends;
    a spring with hook disposed on one strap end, the opposite strap end attached to the lock, the spring with hook removably attached to an outer cable of one module, the tie strap removably passed through the outer cables of adjoining modules;
    a pair of identical ties, each tie having a pair of spaced apart ends, a tie hook disposed on each end, one tie hook removably hooked through one module outer member hole, one tie hook removably hooked through an adjoining module outer member hole;
    a ratchet lock removably connecting the ties;
    whereby a selected number of modules are attached, one to the next, to surround a circumference of an existing tire.

2. A modular tire chain apparatus comprising, in combination:
    a plurality of selectively attached modules, each module having a first end spaced apart from a second end, each module comprising:

a plurality of outer members, each outer member having a pair of spaced apart inwardly disposed bends separated by a shank;
a pair of spaced apart holes in the shank;
a hole disposed in each bend;
an ear extended from each bend;
a hole disposed in each ear;
a plurality of inner members, each inner member having a pair of spaced apart outwardly disposed bends separated by a shank;
a pair of spaced apart holes in the shank;
a hole disposed in each bend;
an ear extended from each bend;
a hole disposed in each ear;
a continuous outer cable passed through each outer member bend hole and each inner member bend hole, the outer cable further passed through each outer member ear hole and each inner member ear hole, the inner members disposed between the outer members;
a first locking plate attached to the outer cable of each module first end;
a latch disposed on the first locking plate;
a second locking plate attached to the outer cable of each module second end;
a pin disposed within the second locking plate, the pin removably attached to the latch;
a continuous inner cable having spaced apart loops;
a plurality of spaced apart cable ties disposed on the inner cable;
a plurality of continuous flexible cross members, each cross member attached to one module outer cable and one module inner cable, each cross member of each module attached to an adjoining cross member, each cross member forming a diamond shape;
a lock having two opposite j-hooks, the j-hooks connecting the inner cable loops;
a tie strap having two spaced apart opposite strap ends;
a spring with hook disposed on one strap end, the opposite strap end attached to the lock, the spring with hook removably attached to an outer cable of one module, the tie strap removably passed through the outer cables of adjoining modules;
a pair of identical ties, each tie having a pair of spaced apart ends, a tie hook disposed on each end, one tie hook removably hooked through one module outer member hole, one tie hook removably hooked through an adjoining module outer member hole;
a ratchet lock removably connecting the ties;
whereby a selected number of modules are attached, one to the next, to surround a circumference of an existing tire.

* * * * *